Dec. 7, 1943.  G. H. AKLIN  2,336,207

LENS

Filed Oct. 8, 1941

F = 100 mm.  f/1.5

| LENS | $N_D$ | V | RADII, mm. | | THICKNESSES, mm | |
|---|---|---|---|---|---|---|
| I | 1.755 | 47.2 | $R_1$ = | + 95.2 | $t_1$ = | 12.3 |
|   |       |      | $R_2$ = | +903.0 | $S_1$ = | 0.4 |
| II | 1.617 | 55.0 | $R_3$ = | + 45.2 | $t_2$ = | 19.2 |
| III | 1.649 | 33.8 | $R_4$ = | −185.8 | $t_3$ = | 4.0 |
|   |       |      | $R_5$ = | + 30.8 | $S_2$ = | 13.9 |
| IV | 1.558 | 45.5 | $R_6$ = | − 53.5 | $t_4$ = | 4.0 |
| V | 1.511 | 63.5 | $R_7$ = | + 40.9 | $t_5$ = | 9.9 |
| VI | 1.755 | 47.2 | $R_8$ = | −3980.0 | $t_6$ = | 6.0 |
|   |       |      | $R_9$ = | − 82.7 | $S_3$ = | 5.6 |
| VII | 1.617 | 38.5 | $R_{10}$ = | +321.0 | $t_7$ = | 4.0 |
| VIII | 1.755 | 47.2 | $R_{11}$ = | + 55.8 | $t_8$ = | 12.3 |
|   |       |      | $R_{12}$ = | −127.9 | BF = | 48.7 |

GEORGE H. AKLIN
INVENTOR

BY *Newton W. Evins*

ATTORNEY

Patented Dec. 7, 1943

2,336,207

UNITED STATES PATENT OFFICE 2,336,207

LENS

George H. Aklin, Rochester, N. Y., assignor to Eastman Kodak Company, Rochester, N. Y., a corporation of New Jersey Application October 8, 1941, Serial No. 414,135

14 Claims. (Cl. 88—57)

This invention relates to lenses and particularly to high aperture photographic objectives.

It is an object of the invention to provide a high aperture lens with high covering power and good correction for the various aberrations including spherical aberration, chromatic aberration, lateral color, curvature of field, astigmatism, sine condition, coma, ghost images, distortion, vignetting, and flare.

Specifically it is an object of the invention to provide a high quality objective covering over 22 degrees from the axis and capable of being used at $f/1.5$ or faster and with exceptionally good correction of the oblique spherical aberration and coma i. e. with exceptionally good rim ray agreement.

Photographic objectives, except for some borderline cases, fall readily into certain recognized types. The present invention applies to a very definite type, namely that having four components the outer two of which are positive and the inner two are compound menisci highly concave toward each other. Many of the outer positive components of this type as shown in the prior art are single elements, although often they are compound cemented or even consist of separated i. e. air spaced elements. The inner meniscus components are usually doublets but sometimes are cemented triplets. The present invention is mostly concerned with the rear half of the objective and is applicable to all of the above variations in the other components, although one feature does relate to the cemented surface in the second component. Reference is made to my copending applications Serial No. 335,783 filed May 17, 1940, now Patent No. 2,262,985, and Serial No. 414,134 filed concurrently herewith, and to my Patents Nos. 2,252,681 and 2,252,682. Reference is also made to copending applications Serial No. 335,785 by Herzberger, now Patent No. 2,289,779, and Serial No. 335,786 by Frederick and Herzberger, now Patent No. 2,262,998, both of which were filed May 17, 1940.

According to the present invention an $f/1.5$ lens has been made in which the oblique images are very sharp up to an angle of about 22° from the axis, and this is done with less of the vignetting at the corners of the film than is usually found necessary in ultra-rapid objectives in order to stop out the flare or out-of-focus rays at the extreme obliquities. The field as computed in the traditional manner is slightly improved, but even further than this the correction of oblique spherical aberration and coma i. e. the rim ray agreement is greatly improved by several constructional features of the objective, and at the same time the usual first order or Seidel aberrations i. e. axial spherical aberration and coma, distortion, and astigmatism, are kept within bounds where they are not objectionable.

In the course of the development of high aperture objectives many of the earlier mathematical relationships have been found inadequate to handle the problems arising. For example some of the mathematical treatises speak of the "spherical aberration which varies as the square of the aperture and is constant for all points of the field." The statement may be true regarding some mathematical abstraction, but practical lens designers not only are acquainted with zonal spherical aberration but also know that the circle of confusion for an oblique pencil of rays, even one that is free from astigmatism and curvature of field, may be ten or even twenty or more times as large as the circle of confusion of an axial pencil of equal aperture. This larger circle of confusion (or more accurately "area of confusion") is due to oblique spherical aberration and coma—the former causing a substantially symmetrical area of confusion and the latter causing unsymmetrical forms. The oblique spherical aberration may be further analyzed into rim ray aberration pertaining to rays in the axial plane and skew ray aberration pertaining to rays outside the axial plane and in particular those in a plane perpendicular thereto.

All this amounts to saying that the spherical aberration, far from being constant, is usually much worse for oblique pencils than for the axial pencil. In consequence, features of an objective that make for better correction on the axis may and often do make for worse oblique spherical aberration, not to mention other oblique aberrations. On the other hand, I have found that features which improve the oblique spherical aberration improve the overall performance of the objective even though the zonal aberration of the axial pencil may be worse, assuming that the primary aberrations are also kept within bounds.

In the type of lens to which this invention relates, it has generally been considered necessary to make the concave surfaces facing the center of the objective very strong in order to correct the axial spherical aberration and the field curvature. However, they also strongly overcorrect the extreme rim and skew rays. I have found it possible to correct the axial spherical aberration at least partly by other means and to make these surfaces weaker than has been the practice heretofore. It is desirable that the numerical sum of their curvatures be less than 5.8 times the reciprocal of the focal length of the objective.

This type of lens has generally been subject to the presence of ghost images if some extremely bright object is in the field of view. These ghost images arise from interreflections between pairs of glass-air surfaces in the lens, particularly the front surface of the third component in combination with either the concave surface facing it or the rear surface of the third component. In addition to the improvement in the oblique aberrations, I have found that making this surface weaker has reduced the trouble from ghost images to a fraction of what it was before.

The front surface of each of the first two components tends to correct the oblique spherical aberration arising at the rear surface of the second component (as numbered from the front of the objective), and accordingly it is desirable to make the front surface of the third component decidedly the weaker of the two adjacent concave surfaces. Its curvature should be less than seven-tenths of the curvature of the other concave surface. It is easily seen that this condition and the condition described just previously taken together define a maximum curvature of the front surface of the third component. In fact, the advantages of these features are obtained in a high degree by satisfying the single condition that the curvature of said surface be less than twice the reciprocal of the equivalent focal length of the objective.

While weakening the concave inner surfaces benefits the oblique spherical aberration very greatly, it tends to produce undercorrected spherical aberration on the axis. Although this can be corrected in any of several ways, I have found certain structures that are much more satisfactory than others because they do not have such an adverse effect upon the primary coma and field curvatures.

A high index positive element in the front component tends toward less undercorrection of the spherical aberration. I prefer that this refractive index be greater than 1.70. The front component may consist entirely of this element or it may be a compound structure such as described in my Patent 2,262,985. Or again it may be divided into two airspaced elements. The latter structure also has a correcting effect upon the aberration, but of course increases the cost of making and mounting the lens.

A cemented surface in the second component, negative in power and concave toward the front is also effective in decreasing the undercorrection of the spherical aberration, but if it is too strong it adversely affects the lower rim rays. The power of this surface should be numerically less than 0.03 and preferably between 0.01 and 0.03 times the power of the objective and the index difference at the surface should be between 0.02 and 0.10.

I have found that making the third component a cemented triplet consisting of a positive element of low refractive index cemented between a biconcave element of higher index on its front and a positive element of still higher index on its rear is very effective in correcting the spherical aberration if each refractive index in said triplet differs from each of the others by at least 0.03, especially if this component also embodies the feature described and shown by Herzberger whereby the index of the rear element is greater than 1.70. I have found that when thus combined the resulting triplet is a particularly advantageous form of that feature of Herzberger's invention and results in greatly improved oblique spherical aberration especially of the upper rim rays. At the same time it furnishes the lens designer a ready means of controlling the Petzval radius and the coma, within a useful range, by varying the refractive indices and the curvatures, especially the second cemented surface of said triplet.

Although the features just described whereby the spherical aberration is corrected are separately effective I prefer to combine them and thus divide the corrective function among the first three components as this arrangement results in the best zonal aberrations in the final image.

I have found that decreasing the thickness of the third component also decreases the undercorrection of the aberration. This thickness should be as small as convenient for manufacture, preferably less than one fourth of the local length of the objective.

Incidentally, a further means of reducing the upper rim ray aberration is a rear component consisting of a negative element cemented to the front of a positive element with a refractive index exceeding that of the negative element by more than 0.08 and preferably with the cemented surface having a radius of curvature between 0.4 and 1.0 times the focal length of the objective and convex to the front.

Figure 1:
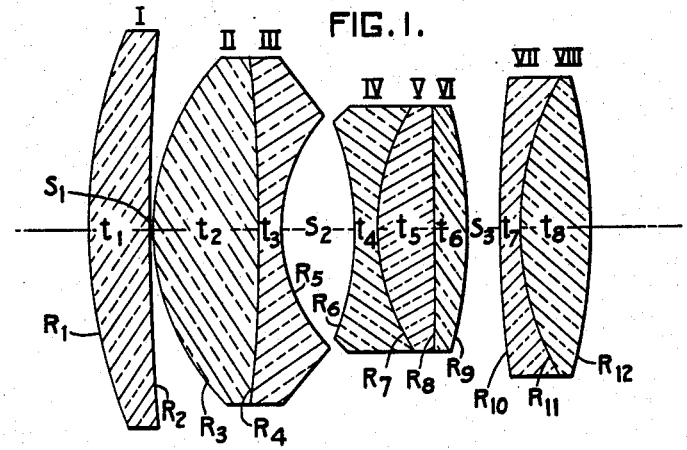
Fig. 1 shows a photographic objective according to the invention and the constructional data of one example embodying all the features of the invention.

The constructional data of the example shown in the drawing are as follows:

*Example 1*

$f=100$ mm.          $f/1.5$

| Lens | $N_D$ | V | Radii (mm.) | Thicknesses |
|---|---|---|---|---|
| I | 1.755 | 47.2 | $R_1=+\ 95.2$ | $t_1=12.3$ mm. |
|   |       |      | $R_2=+\ 903.0$ | $s_1=0.4$ |
| II | 1.617 | 55.0 | $R_3=+\ 45.2$ | $t_2=19.2$ |
| III | 1.649 | 33.8 | $R_4=-\ 185.8$ | $t_3=4.0$ |
|   |       |      | $R_5=+\ 30.8$ | $s_2=13.9$ |
| IV | 1.558 | 45.5 | $R_6=-\ 53.5$ | $t_4=4.0$ |
| V | 1.511 | 63.5 | $R_7=+\ 40.9$ | $t_5=9.9$ |
| VI | 1.755 | 47.2 | $R_8=-3980$ | $t_6=6.0$ |
|   |       |      | $R_9=-\ 82.7$ | $s_3=5.6$ |
| VII | 1.617 | 38.5 | $R_{10}=+\ 321.0$ | $t_7=4.0$ |
| VIII | 1.755 | 47.2 | $R_{11}=+\ 55.8$ | $t_8=12.3$ |
|   |       |      | $R_{12}=-\ 127.9$ | $BF=48.7$ mm. |

A slight modification is as follows:

*Example 2*

$f=100$ mm.          $f/1.5$

| Lens | $N_D$ | V | Radii (mm.) | Thicknesses |
|---|---|---|---|---|
| I | 1.755 | 47.2 | $R_1=+96.3$ | $t_1=9.4$ mm. |
|   |       |      | $R_2=+982.4$ | $s_1=0.4$ |
| II | 1.617 | 55.0 | $R_3=+46.3$ | $t_2=19.2$ |
| III | 1.649 | 33.8 | $R_4=-174.4$ | $t_3=4.0$ |
|   |       |      | $R_5=+32.4$ | $s_2=13.9$ |
| IV | 1.558 | 45.5 | $R_6=-54.4$ | $t_4=4.0$ |
| V | 1.512 | 60.5 | $R_7=+41.3$ | $t_5=10.9$ |
| VI | 1.755 | 47.2 | $R_8=-306.3$ | $t_6=5.0$ |
|   |       |      | $R_9=-77.1$ | $s_3=5.6$ |
| VII | 1.617 | 38.5 | $R_{10}=+284.8$ | $t_7=4.0$ |
| VIII | 1.755 | 47.2 | $R_{11}=+55.8$ | $t_8=12.2$ |
|   |       |      | $R_{12}=-145.0$ | $BF=50.0$ mm. |

In the above table and the accompanying drawing, $f$ refers to the focal length of the lens, the Roman numerals refer to the lens elements numbered from the front, $N_D$ is the index of refraction for the D line of the spectrum, V is the dispersive index, R, $t$, and $s$ are the radii of curvature, the thicknesses and the spacings respectively from front to rear and BF is the back focal length of the lens.

It will be seen that these two examples are of the general type described as comprising four airspaced components, the outer two of which are positive and the inner two are strongly meniscus concave toward each other. By strongly meniscus is meant that the curvatures $$\frac{1}{R_5} \text{ and } \frac{1}{R_6}$$

of the surfaces adjacent the central airspace $s_3$ are of such magnitude that the sum of their absolute values is greater than about twice the reciprocal of the focal length of the objective.

The salient features of these examples which accord with the invention are as follows:

The absolute values of the curvatures $$\frac{1}{R_6} \text{ and } \frac{1}{R_5}$$

of the front surface of the third component and of the rear surface of the second component, and their sum are as follows:

in Example 1:

$$\left|\frac{1}{R_6}\right| + \left|\frac{1}{R_5}\right| = \left(\frac{1.87}{f} + \frac{3.26}{f}\right) = \frac{5.13}{f}$$

in Example 2:

$$\left|\frac{1}{R_6}\right| = \left|\frac{1}{R_5}\right| = \left(\frac{1.84}{f} + \frac{3.12}{f}\right) = \frac{4.96}{f}$$

also their ratio $|R_5/R_6|$ is 0.58 and 0.59 respectively in the two examples.

In the second component the cemented surface is concave toward the front and its power $$\frac{N_{III} - N_{II}}{R_4} \text{ is } \frac{-0.0172}{f}$$

in Example 1, and $$-\frac{0.0183}{f}$$

in Example 2. The index difference at this surface is 0.032 in each case.

The third component is a cemented triplet consisting of a positive element V with low refractive index 1.51 between a negative element IV whose refractive index $N_D$ is 0.05 greater cemented on its front and a positive element VI whose index is 0.24 greater cemented on its rear. The index difference between the rear element VI and the front element IV of this triplet is 0.197.

In the rear component the negative element VII is cemented on the front of the positive element VIII whose refractive index $N_D$ is higher by 0.138. The radius $R_{11}$ of the cemented surface is between 40 and 100 mm.

The front surface of the third component has a radius of curvature $R_6$ numerically greater than 50 mm. in each example.

These examples also embody the features which I prefer to combine with my invention. The thickness ($t_4 + t_5 + t_6$) of the third component is 19.9 mm. in both examples, and this is less than one-fourth of the focal length of the objective. Furthermore, the front component has a positive element I with a refractive index $N_D$ greater than 1.70. In these examples this element constitutes the entire component, but the invention may also be embodied in lenses of the same general type in which the front component is compounded or even divided by an airspace and having the greater refinement in the correction of zonal aberration which may be obtained by this more expensive structure.

Figure 2:
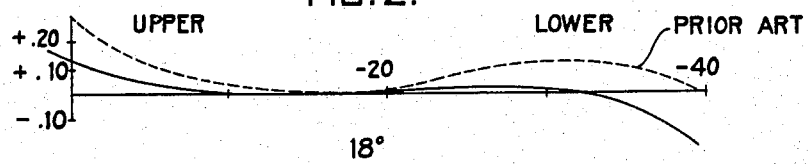
Fig. 2 shows the rim ray curve at 18° from the axis.
Figure 3:
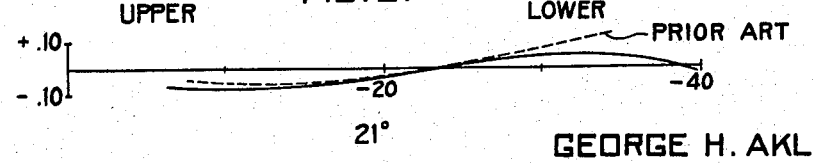
Fig. 3 shows the rim ray curve at 21° from the axis.

The rim ray curves in Figs. 2 and 3 are drawn for Example 1. The prior art refers to Example 1 in my Patent No. 2,252,682, which is the best $f/1.5$ objective covering such a wide field that was known to me previously. In the new objective the rim ray agreement has been considerably improved, and at the same time the aperture of the rear window increased so as to let through more light as indicated by the greater length of the curves in Figs. 2 and 3. The axial spherical aberration held within useful tolerances and the slight improvement of the field curvature are not the primary advantages of this invention which is mainly directed to improved rim ray correction.

In Figs. 2 and 3 the horizontal scale indicates the distance above or below the axis at which an oblique ray in the axial plane intersects a perpendicular plane tangent to the vertex of the front surface of the objective, a negative sign indicating that it intersects below the axis. The vertical scale refers to the Gaussian image plane for an object point at infinity and indicates the distance of the intersection point of each ray above or below the intersection point of the central or principal ray of the same pencil. These rays are assumed to approach the objective from a point below the axis at infinity.

For the 18° rays as shown in Fig. 2 it will be noted that two thirds of the length of the curve (from $-5$ to about $-33$) lies within the limits of $+0.03$ and $-0.01$ on the vertical scale. Due to the shape of the pupil of the objective, the ends of the curve represent a smaller quantity of light proportionately than the center, so that the above mentioned limits include about four fifths of the light passing through the objective at this obliquity. It will be seen that the same segment of the curve for the prior art varies from 0.00 to about $+0.11$, or more than twice as much.

The 21° rim rays as shown in Fig. 3 are similarly improved.

Sample objectives constructed according to the invention show definitely sharper images in test photographs than any prior 1.5 objectives of this type.

Having now described and illustrated my invention, I wish to point out that it is not restricted to the examples shown but is of the scope of the appended claims.

What I claim is:

1. A high aperture objective of the type comprising four coaxial airspaced components of which the outer two are positive and the inner two are compound menisci highly concave toward each other and in which the thickness of the third component as numbered from the front is less than one-fourth of the total length of the objective, characterized by the absolute value of the curvature of the front surface of the third component being less than seven-tenths of that of the rear surface of the second component and by the sum of these two values being between 2 and 5.8 times the reciprocal of the focal length of the objective.

2. An objective according to claim 1 in which the refractive index of a positive element of the front component is greater than 1.70.

3. An objective according to claim 1 also characterized by the second component having a cemented surface concave to the front whose power is negative and numerically less than 0.03 times the power of the objective.

4. An objective according to claim 1 also characterized by the third component being a cemented triplet consisting of a positive element between a negative element of higher refractive index on the front and a positive element of still higher index on the rear, each index in the triplet differing from each of the other two by more than 0.03.

5. An objective according to claim 1 also characterized by the rear component having a cemented surface convex to the front with a radius of curvature between 0.4 and 1.0 times the focal length of the objective and by the element following said surface having a refractive index at least 0.08 higher than that of the element preceding the surface.

6. A high aperture objective of the type comprising four coaxial airspaced components of which the outer two are positive and the inner two are compound menisci highly concave toward each other, characterized by the third component as numbered from the front being a cemented triplet consisting of a positive element between a negative element of higher refractive index on the front and a positive element of still higher index on the rear, each index in the triplet differing from each of the other two by more than 0.03.

7. An objective according to claim 6 in which the axial thickness of said third component is less than one-fourth of the focal length of the objective.

8. An objective according to claim 6 also characterized by the front surface of said third component having a radius of curvature greater than one-half the focal length of the objective.

9. An objective according to claim 6 also characterized by the front surface of the third component having a curvature smaller than seven-tenths of that of the rear surface of the second component.

10. An objective according to claim 6 also characterized by the sum of the absolute values of the curvatures of the rear surface of the second component and the front surface of the third component being less than 5.8 times the reciprocal of the focal length of the objective.

11. An objective of the type consisting of four coaxial airspaced components of which the outer two are positive and the inner two are compound menisci highly concave toward each other, in which the thickness of the third component is less than one-fourth of the focal length of the objective, and in which the front component comprises a positive element whose refractive index is greater than 1.70, characterized by the second component having a cemented surface concave to the front with negative power numerically between $0.01/f$ and $0.03/f$ and with a refractive index difference at said surface greater than 0.02 and less than 0.10 where $f$ is the focal length of the objective, and further characterized by the rear component being a cemented doublet consisting of a negative element cemented to the front of a positive element whose refractive index exceeds that of the negative element by more than 0.08, the cemented surface having positive power and a radius between $0.4f$ and $f$.

12. A high aperture objective of the type comprising four coaxial airspaced components of which the outer two are positive and the inner two are compound menisci highly concave toward each other and in which the thickness of the third component as numbered from the front is less than one-fourth of the focal length of the objective, characterized by the concave front surface of the third component having a radius of curvature greater than one-half of the focal length of the objective and less than said focal length.

13. An objective according to claim 12 in which the second component has a cemented sruface which is concave to the front and has negative power less than 0.03 times that of the objective and at which the refractive index difference is greater than 0.02 and less than 0.10.

14. An objective according to claim 12 in which the rear component is a cemented doublet consisting of a negative element cemented to the front of a positive element whose refractive index exceeds that of the negative element by more than 0.08.

GEORGE H. AKLIN.

CERTIFICATE OF CORRECTION.

Patent No. 2,336,207.  December 7, 1943.

GEORGE H. AKLIN.

It is hereby certified that error appears in the printed specification of the above numbered patent requiring correction as follows: Page 3, second column, line 65, claim 1, for "total" read --focal--; page 4, second column, line 37, claim 13, for "sruface" read --surface--; and that the said Letters Patent should be read with this correction therein that the same may conform to the record of the case in the Patent Office.

Signed and sealed this 15th day of February, A. D. 1944.

(Seal)

Henry Van Arsdale,
Acting Commissioner of Patents.